US010733311B2

(12) United States Patent
Chen et al.

(10) Patent No.: US 10,733,311 B2
(45) Date of Patent: Aug. 4, 2020

(54) COGNITIVE INTERNET OF THINGS (IOT) GATEWAYS FOR DATA SECURITY AND PRIVACY PROTECTION IN REAL-TIME CONTEXT-BASED DATA APPLICATIONS

(71) Applicant: International Business Machines Corporation, Armonk, NY (US)

(72) Inventors: Sue Ann Chen, Carlton (AU); Fatemeh Jalali, Hawthorn East (AU); Mahsa Salehi, Southgate (AU); Arun Vishwanath, Blackburn (AU)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 15/472,369

(22) Filed: Mar. 29, 2017

(65) Prior Publication Data
US 2018/0285580 A1    Oct. 4, 2018

(51) Int. Cl.
*G06F 21/00* (2013.01)
*G06F 21/62* (2013.01)
(Continued)

(52) U.S. Cl.
CPC ........ *G06F 21/6218* (2013.01); *G06F 21/316* (2013.01); *G06F 21/6254* (2013.01); *G06Q 40/08* (2013.01); *H04W 12/02* (2013.01)

(58) Field of Classification Search
CPC ... G06F 21/6218; G06F 21/316; G06Q 40/08; H04L 63/02
See application file for complete search history.

(56) References Cited

U.S. PATENT DOCUMENTS

| 5,797,134 A | 8/1998 | McMillan et al. |
| 8,484,113 B2 | 7/2013 | Collopy et al. |

(Continued)

FOREIGN PATENT DOCUMENTS

JP    2002259708 A    9/2002

OTHER PUBLICATIONS

Statista, "Largest insurance companies worldwide as of Mar. 2016, by market capitalization (in billion U.S. Dollars)", Statista, https://www.statista.com/statistics/431547/leading-insurance-companies-worldwide-by-market-cap/, Accessed on Mar. 27, 2017, 4 pages.

(Continued)

*Primary Examiner* — Jeffrey C Pwu
*Assistant Examiner* — William A Corum, Jr.
(74) *Attorney, Agent, or Firm* — Scully, Scott, Murphy & Presser, P.C.; Joseph Petrokaitis

(57) ABSTRACT

A cognitive IoT gateway may receive real-time data associated with a user from sensor devices that are detecting user data in real-time. The real-time data is analyzed to determine whether the real-time data indicates a deviation from a predicted user behavior data predicted based on historical data. The real-time data is transformed into collated data that removes protected and sensitive information from the real-time data, and the collated data is transmitted to a server computer, wherein the protected and sensitive information received from the sensor devices remain local to the cognitive IoT gateway. Updated information computed by the server computer based on the collated data is received and a real-time alert is sent to a user device notifying the user of the updated information.

15 Claims, 5 Drawing Sheets

(51) Int. Cl.
  *G06F 21/31*   (2013.01)
  *G06Q 40/08*   (2012.01)
  *H04W 12/02*   (2009.01)

(56) References Cited

U.S. PATENT DOCUMENTS

| | | |
|---|---|---|
| 9,162,032 B2 | 10/2015 | Lynch, Jr. |
| 2002/0128882 A1* | 9/2002 | Nakagawa ............ G06Q 30/02 |
| | | 705/4 |
| 2004/0153362 A1 | 8/2004 | Bauer et al. |
| 2007/0027726 A1 | 2/2007 | Warren et al. |
| 2013/0297418 A1 | 11/2013 | Collopy et al. |
| 2014/0067434 A1 | 3/2014 | Bourne et al. |
| 2014/0257874 A1 | 9/2014 | Hayward et al. |
| 2014/0343972 A1* | 11/2014 | Fernandes ............ G08G 5/0039 |
| | | 705/4 |
| 2015/0032481 A1* | 1/2015 | Norling-Christensen ................... |
| | | G06Q 40/08 |
| | | 705/4 |
| 2015/0324923 A1* | 11/2015 | Christensen .......... G06Q 40/08 |
| | | 705/4 |
| 2016/0071219 A1* | 3/2016 | Joshi ................. G06Q 30/0269 |
| | | 705/4 |
| 2016/0171521 A1* | 6/2016 | Ramirez ............ G06Q 30/0224 |
| | | 701/409 |
| 2016/0277528 A1* | 9/2016 | Guilaume ............. H04L 67/306 |
| 2017/0365007 A1* | 12/2017 | Huls ...................... G06Q 40/08 |
| 2018/0025430 A1* | 1/2018 | Perl .................... B60R 16/0231 |
| | | 705/4 |
| 2018/0050698 A1* | 2/2018 | Polisson ............. B60W 30/182 |
| 2018/0075538 A1* | 3/2018 | Konrardy ............ G06Q 40/08 |

OTHER PUBLICATIONS

Pramanick, S., "Dynamic Insurance Pricing—Telematics Analytics & Behavioural monitoring", LinkedIn, https://www.linkedin.com/pulse/dynamic-insurance-pricing-telematics-analytics-pramanick-fca-pmp, Published on Jun. 1, 2015, Accessed on Mar. 27, 2017, 3 pages.

* cited by examiner

COGNITIVE INTERNET OF THINGS (IOT) GATEWAYS FOR DATA SECURITY AND PRIVACY PROTECTION IN REAL-TIME CONTEXT-BASED DATA APPLICATIONS

FIELD

The present application relates generally to computers and computer applications, and more particularly to data security for real-time context-based data and cognitive computing.

BACKGROUND

High proliferation of wearable devices coupled with uptake of Internet of Things (IoT) devices provides data connectivity as it has never been seen before. However, using such data for real-time dynamic applications presents challenges in privacy protection and data security.

Insurance for health, home, car and others is generally computed in a relatively static manner. For instance, an individual's health insurance may be computed based on age, predisposition to illness, health habits, and others. Home insurance is computed based on location of the home, when it was built, the type of construction materials used, and others. Car insurance is computed based on where it is parked, how often it is driven, how many drivers use the car, the car make and model, and others. Once these factors are determined, the insurance premium is computed only once, and the amount is paid by the customer monthly or annually. These methods assume risks to be relatively static.

BRIEF SUMMARY

A system and method of providing a cognitive IoT gateway may be provided. The method may be executed by at least one hardware processor communicatively coupled to at least a server computer and sensor devices. The method, in one aspect, may include receiving from the server computer a predicted user behavior data associated with a user, wherein the server computer has provided an offering to the user based on the predicted user behavior. The method may also include receiving real-time data associated with the user from the sensor devices that are detecting user data in real-time. The method may further include determining whether the real-time data deviates from the predicted user behavior data. The method may also include, responsive to determining that the real-time data deviates from the predicted user behavior data, transforming the real-time data into collated data that removes protected and sensitive information from the real-time data, and transmitting the collated data to the server computer, wherein the protected and sensitive information received from the sensor devices remain local to the hardware processor. The method may also include receiving from the server computer an updated offering, the updated offering computed by the server computer based on the collated data. The method may further include transmitting a real-time alert to a user device to notify the user of the updated offering from the server computer.

A cognitive Internet of Things (IoT) gateway system, in one aspect, may include a hardware processor communicatively coupled to a server computer and sensor devices. The hardware processor may receive from the server computer a predicted user behavior data associated with a user, wherein the server computer has provided an offering to the user based on the predicted user behavior. The hardware processor may receive real-time data associated with the user from the sensor devices that are detecting user data in real-time. The hardware processor may determine whether the real-time data deviates from the predicted user behavior data. Responsive to determining that the real-time data deviates from the predicted user behavior data, the hardware processor may transform the real-time data into collated data that removes protected and sensitive information from the real-time data, and transmit the collated data to the server computer, wherein the protected and sensitive information received from the sensor devices remain local to the hardware processor. The hardware processor may receive from the server computer an updated offering, the updated offering computed by the server computer based on the collated data. The hardware processor may transmit a real-time alert to a user device to notify the user of the updated offering from the server computer.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Cognitive gateways installed on local devices (e.g., a user device) provide data security and privacy protection by leveraging data inputs available from various Internet of Things (IoT) devices and/or sensors, smartphones, and other such devices. A system and method in one embodiment may leverage real-time dynamic data in a secure way, collected from these IoT sensors and/or devices, for an application in insurance industry. For instance, the system and method may determine insurance premium dynamically, for example, in real-time (e.g., seconds, minutes or hours), taking into account that risks and circumstances surrounding the policyholders or entities are changing (i.e., are dynamic). The system and method may leverage data in a secure manner from various Internet of Things (IoT) devices and/or sensors, smartphones, and other such devices, via cognitive gateways, and take into account the context that the entity being insured (e.g., individuals, homes, cars, and others) is currently in. The system and method may also provide activity prediction in computing the pricing premium.

The system and method of the present disclosure in one embodiment may include local cognitive IoT gateways that can be used to determine premium in dynamic and real-time manner based on behavioral monitoring of IoT devices, while at the same time providing protection of privacy and/or data security. The dynamic insurance pricing is cognizant of user's privacy and contextual information.

Figure 1:
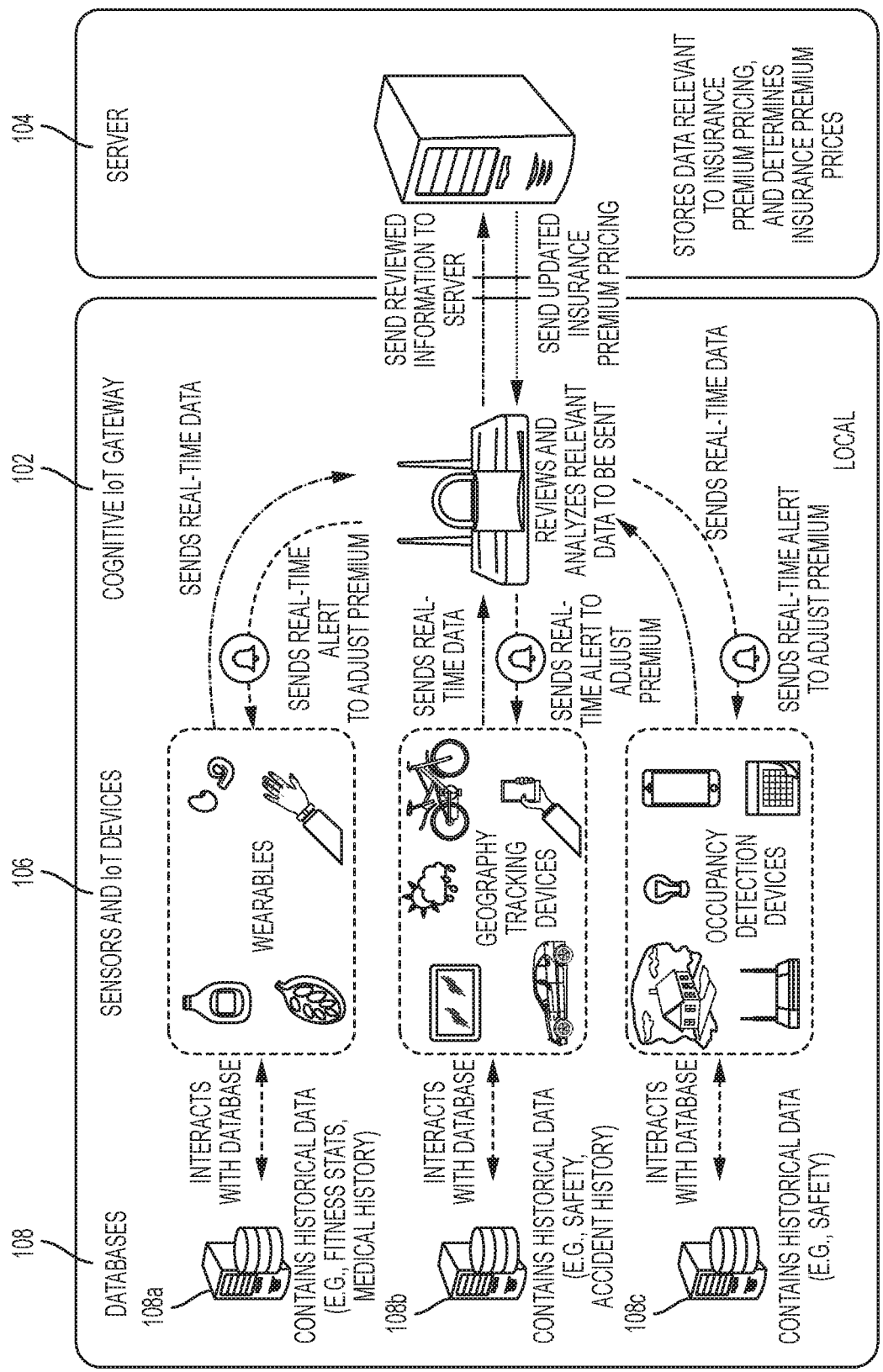
FIG. 1 is a diagram illustrating system architecture of a system of the present disclosure in one embodiment.

FIG. 1 is a diagram illustrating system architecture of a system of the present disclosure in one embodiment. A cognitive Internet of Things (IoT) gateway 102 in one embodiment monitors and stores (e.g., with the permission of users or individuals involved) data associated with entities, for example, vehicle, home, individual, and generates reports autonomously and sends automatic reports of information (absent any protected or private data) that is needed by a server 104 for an application, for example, responsive to detecting changes in context surrounding the entity. The cognitive IoT gateway 102 generates the reports of information so that the information in the reports do not contain any sensitive, protected and/or private data, yet the server 104 is able to use the information in its processing. For instance, any sensitive information remains in the cognitive IoT gateway 102, local to that device, and is not transmitted to a server 104. The cognitive IoT gateway 102 may autonomously detect the context surrounding the entity changes, generate a report of information and send the report of information to a server 104. An example of a cognitive IoT gateway is a smartphone, a home modem, a wireless router, a single board computer, and other devices, having at least a hardware processor and software components, and communication functionalities. The cognitive IoT gateway is coupled to sensor and/or other IoT devices 106 that can collect data or information from the entities. The cognitive IoT gateway 102 may be preloaded by apps (e.g., smartphone application) from the server 104, for example, for communicating data or information to and from the server 104 for its application. An example application is in the insurance industry. The server 104 may be associated with an insurance company, for example, an insurance company's server that functions to support the insurance company. An app provided by the insurance company's server may be preloaded onto a smartphone device that functions as a cognitive IoT gateway. For example, a cognitive IoT gateway can be pre-loaded by one or more apps from an insurance company for the purposes of communicating information to the insurance servers, communicating dynamic pricing to an individual, and to ascertain any changes to the contextual information.

Examples of sensor and IoT devices 106 may include, but are not limited to wearable devices, location tracking devices such as global positioning system (GPS) devices, cameras installed in the areas such as homes, motion detectors, utility usage sensors or readers, other devices that may detect occupancy and/or location. The sensor and IoT devices 106 may continuously detect current context of entities and send real-time data to the cognitive IoT gateway 102. In one embodiment, each of the sensor and IoT devices 106 sends its real-time data to the cognitive IoT gateway. The context of the entities is deemed to have changed by the cognitive IoT gateway when the current real-time data deviates from predicted and/or past user behavior. Predicted user behavior is computed via application of machine learning techniques such as regression and neural network algorithms on historical data that may be stored on the IoT devices or in a database, while past user behavior is determined from data stored in the sensor and/or IoT devices which have built-in memory capabilities. Change of context can be inferred by the cognitive IoT gateway when for example the home IoT gateway determines that the users' devices are not connecting to it over the timeframe when they normally establish a connection. Or when the users' mobile phone notes that the location of the user has changed from the typical base location (e.g., Country X) to a different location (e.g., Country Y).

Examples of application context may include home and contents insurance. For example, an insurance company may offer lower premium rates than normal when the presence of home owner is detected, for example, via phone connection to home and/or WiFi network, which deviates from predicted home presence for particular time. Another example of application context may include travel and/or health insurance. Insurers may implement different premium rates depending on the policyholder's location and mode of travel. For example, traveling in Country ABC versus traveling in Country XYZ, walking in Location ABC versus taking a taxi versus using public transportation such as buses or trains for commuting. Yet another application context may include car insurance. Insurers may implement different premium rates if policyholder heeds travel advisory to use different routes in lower risk areas or suburbs (via phone GPS signal and historical area safety data).

Examples of protecting privacy in the application in dynamic insurance pricing may include the following. For example, a car insurance company may adjust the insurance pricing based on Pay-as-you-drive (PAYD) and Pay-how-you-drive (PHYD). One factor that may change the price in PHYD is road types (paved or unpaved). In this example case, the insurance company may need to know the car location to determine the road type of the road that an insured is driving on. In the present disclosure in one embodiment, instead of directly communicating the specific or exact location of the car (and therefore the driver or the insured), the IoT gateway with a preloaded map and a local GPS and, for example, other IoT sensors can examine the road type according to the location of the car and send a report about the percentage of time that the car spent driving on particular road type, for example, unpaved or paved road.

In one embodiment, an insurance company's server may determine the insurance premium predictively based on historical travel patterns and anticipated routes taken by the user. The insurance company's server may determine a driving profile of an insured, for example, using historical data, and determine the premium rate based on the driving profile. Thereafter, the insurance company's server may determine incremental changes to the premium rate based on the dynamic information received from a cognitive IoT gateway. The information that is received from the cognitive IoT gateway does not contain any protected or private information concerning the insured, thereby preserving data privacy.

Referring to FIG. 1, sensors and IoT devices 106 communicate or interact with databases 108. A database at 108a may store historical data, for example, fitness statistics of an individual, medical history of an individual, and/or other health information. Health information pertaining to a particular individual such as number of steps taken daily and heart rate are received from IoT devices 106 such as fitness trackers and smartphones equipped with a pedometer, and can be used to provide a more accurate health profile of an individual for premium pricing purposes. A database at 108b may store historical data including safety information about an area or neighborhood, accident history of an area or neighborhood, road information about an area, and other driving or parking conditions about an area or neighborhood, map of an area, and/or other data about an area. These types of information are received from IoT devices 106 capable of geography tracking, such as GPS units and smartphones. For example, GPS units are preloaded with road information and other parking conditions while smartphones provide up-to-date information about safety alerts at an insured's current location. A database at 108c may store historical data that may include safety information associated with an area or neighborhood and other risk information associated with an area or neighborhood. For example, the information can be received from electronic communication on smartphone devices 106 and/or information from local government or like websites.

Sensors and IoT devices 106 detect real-time data, for example, current location, whether a building or home is currently occupied. In one embodiment, a home may be determined to be occupied when the home Wi-Fi router/access point (i.e. cognitive IoT gateway) detects the insured individual's mobile phone/laptop/tablet, or another such device. The location of the individual can also be determined through calendar entries in the individual's smartphone which usually contains venue information of an event the individual may be attending. In another example, information on electricity usage in an insured's home, collected via smart meters, can indicate the home occupancy status. These IoT devices then send the data to a cognitive IoT gateway 102 at every specified interval. The interval may be configured, for example, predefined.

The cognitive IoT gateway 102 receives, reviews and analyzes the data, and determines if the context of the insured has changed. For example, when insured individual moves out of the individual's base location or when there are no occupants in the house. The gateway generates a report that only includes information needed by the server 104 for its application, stripping out any private or protected aspect of the data. For instance, the cognitive IoT gateway 102 may transform or convert a specific location data into a generic form that does not reveal the specific location. For instance, the cognitive IoT gateway 102 may determine the type of information needed by the server 104 and determine what type the specific location data falls into. The generic form of data that is generated from the specific location data may be the amount of time an insured has spent in that type of location. For example, the cognitive IoT gateway 102 may determine based on the specific location, the condition of the roads at that location, and only send to the server, the amount of time that is spent on routes having that condition. To illustrate, the cognitive IoT gateway, having received information on current road conditions from geography tracking devices, reviews the information and compares it with the insured's historical travel data (stored in database 108b). In one embodiment, one or more machine learning techniques can be used to determine if the road conditions of the insured's current location are different from the insured's typical road conditions (e.g., rough terrains versus paved highway roads). In such situations, the cognitive IoT gateway sends the duration of time spent on the current road conditions to the insurance company server. As another example, information such as whether a home or another building is currently occupied may be transformed to the amount of time that home or building has occupancy. In this scenario, for example, the cognitive IoT gateway receives information from the insured's home router that the insured is at home on a particular time, for example, day of the week, and compares this information with historical data stored in database 108c (assume for example, the insured is usually not home on this day of the week). In one embodiment, the cognitive IoT gateway uses an anomaly detection technique such as k-nearest neighbor algorithm to determine that this behavior deviates from the insured's normal routine and sends the duration of time the insured is home to the insurance server. In another example, an up-to-date general health profile of an individual (e.g., duration of high intensity activity) can be determined from information collected by and received from fitness trackers (e.g., times of day when the individual walks or is active, number of stairs climbed, heart rate). An anomaly detection technique such as cluster analysis can be used to ascertain that the insured is exercising more than normal (based on historical health data), in which case the cognitive IoT gateway sends the duration of high intensity activity to the insurance server.

A server at 104 stores, for example, data relevant to insurance premium pricing and determines insurance premium prices. The server 104 receives the generic information generated by the cognitive IoT gateway 102 and based on the information computes a dynamic premium. For instance, for determining a dynamic premium on car insurance, if the information indicates that the insured is spending more time in driving on roads that have different conditions than before, the premium may be dynamically adjusted to reflect that information. The server 104 sends updated insurance premium pricing to the cognitive IoT gateway 102. The cognitive IoT gateway 102 sends a real-time alert to a user's device (e.g., smartphone preloaded with the insurance company's app) notifying the user of the adjusted premium. For example, an insured's home router/single board computer device/smartphone (for example, acting as the cognitive IoT gateway) receives a push notification from the insurance company server of the change in premium price. The user's cognitive IoT gateway then sends an alert to the insured, such as a text message, or push notification, (shown on the smartphone, or on one or more wearable devices) notifying the insured of the change in premium price.

Figure 2:
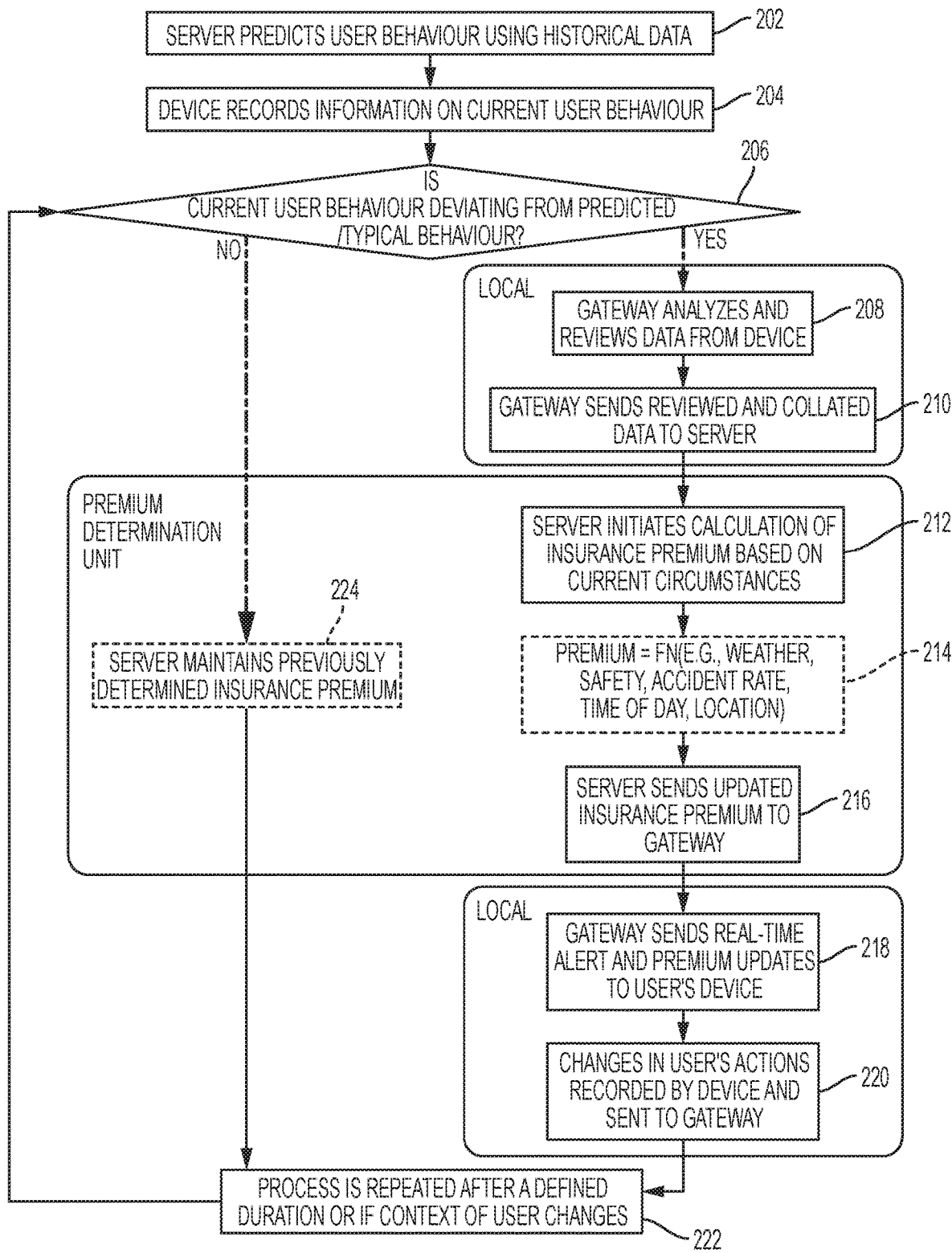
FIG. 2 is a flow diagram illustrating a method of the present disclosure with reference to a general scenario.

FIG. 2 is a flow diagram illustrating a method in one embodiment of the present disclosure with reference to a general scenario. At 202, a server predicts user behavior using historical data. A known prediction algorithm such as regression or neural network algorithm may be employed to predict user behavior based on historical data.

At 204, one or more sensor devices or IoT devices record information on current user behavior. For example, one or more fitness trackers with in-built memory record information such as the number of steps the user has taken in a day, heart rate, the duration the user exercises, and send the information to the database 108a. These wearable devices and/or sensor devices send their real-time data to the cognitive IoT gateway, which could be the users' smartphone. The context of the entities is deemed to have changed when the current real-time data deviates from predicted and/or past user behavior. Predicted user behavior is computed via application of machine learning techniques such as regression and neural network algorithms on historical data that may be stored on the IoT devices or in a database, while past user behavior is determined from data stored in the sensor and/or IoT devices which have built-in memory capabilities.

At 206, the cognitive IoT gateway determines whether the current user behavior is deviating from the predicted behavior and sends the report to the server. The cognitive IoT gateway performs the check in order to protect users' privacy. For example, the data predicted at 202 is compared with the data of the current user behavior. The server predicts the best behavior/action to users according to historical data from the insurance database and recommendations (e.g., road safety, hazard) and sends the predicated route to the IoT gateway to inform the user. Then, the actual action/behavior is identified using embedded sensors and IoT devices (e.g., GPS, movement trackers) connected to the gateway. The cognitive IoT gateway compares the predicated action/behavior with the current actual action/behavior.

The current user behavior is determined to be deviating from the predicted behavior if the difference between the two data is greater that a threshold value or outside of a marginal value. In some embodiments, this can be determined using anomaly detection techniques such as cluster analysis and k-nearest neighbors.

If the current user behavior is deviating from the predicted user behavior, at 208, a gateway device that is local to the user analyzes and reviews data from the one or more sensor devices. The gateway device then generates a collated data that does not include private or protected information. At 210, the gateway sends the collated data to the server. In this way, private and protected information stays within the locality of the user, e.g., user's own device, and is not disseminated to another recipient device such as a company's server.

At 212, the server (e.g., server computer) receives the collated data, and initiates computation of insurance premium based on current circumstance indicated by the collated data.

For example, as shown at 214, a premium may be computed as a function of weather, safety information, accident rate and time of day. The gateway is preloaded with a map from insurance company. The insurance company can update the map over time by sending information such as safety, accident rate, etc. to give the best premium.

At 216, the server sends the updated insurance premium to the cognitive IoT gateway.

At 218, the cognitive IoT gateway receives the updated insurance premium and sends a real-time alert and premium update to a user's device.

At 220, sensor and/or IoT devices continue to detect and record user actions, and changes are recorded and sent to the gateway device. At 222, the process repeats after a configured duration or if the context of the user changes. An example of context change in user is the user driving on paved roads again (that is, the user's normal routine) after being on rough terrains for a definite amount of time. In another example, the context of a user is deemed to have changed when the user who is home on a Saturday evening (contrary to the user's historical data which indicates the user is usually not home on Saturday night) goes out later that night. For instance, after a configured duration expires and/or responsive to detecting a change in user context, the logic of the process returns to 206 to iterate the processing.

At 206, responsive to detecting that there is no deviation or the deviation is within a threshold, the processing may repeat, for example, after an expiration a configured duration or responsive to detecting a changing in user context at 222. In this scenario, the server maintains previously determined insurance premium as shown at 224.

Figure 3:
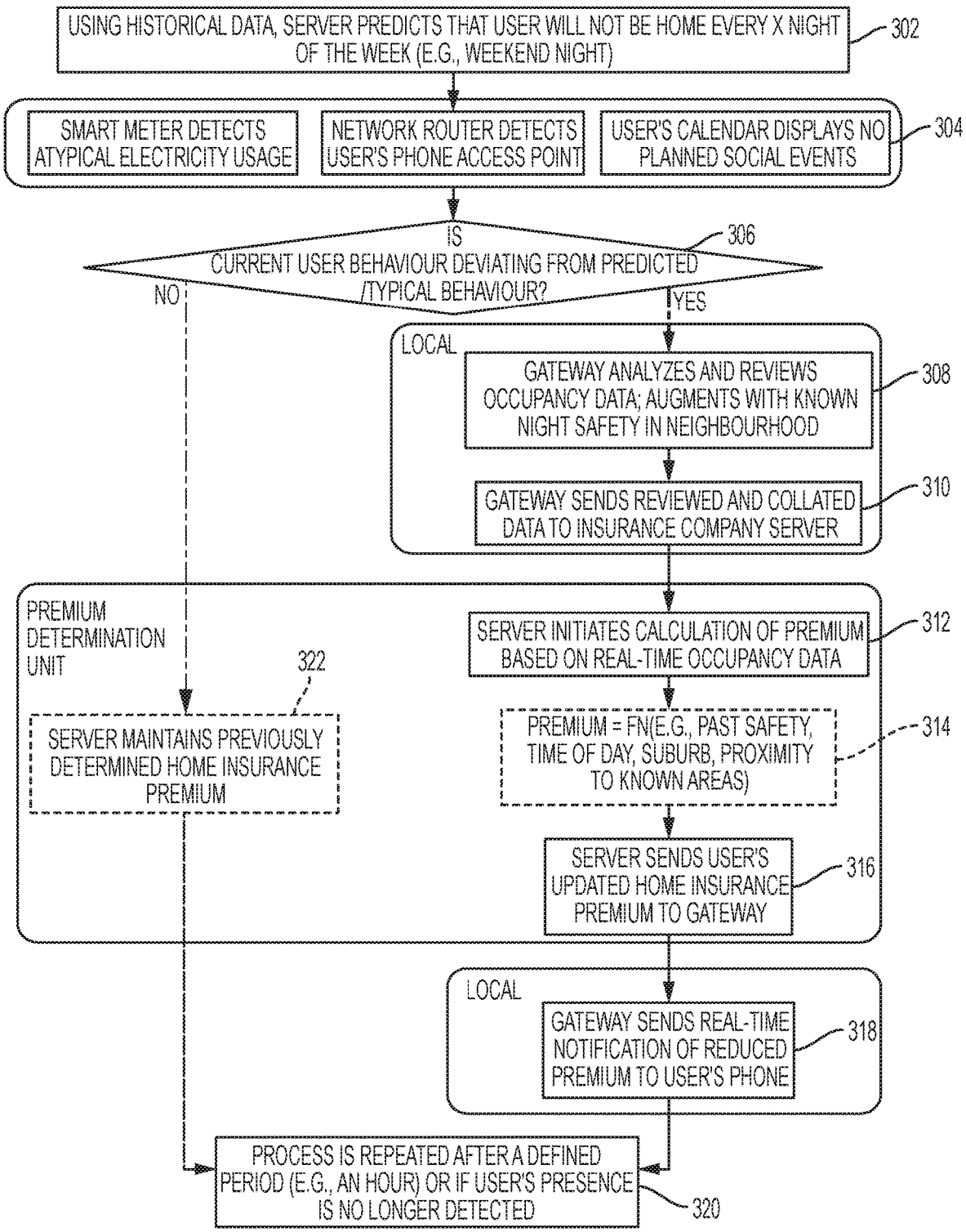
FIG. 3 is a flow diagram illustrating a method of the present disclosure in one embodiment in an example scenario.

FIG. 3 is a flow diagram illustrating a method of the present disclosure in one embodiment in an example scenario, for example, in determining home insurance premium based on dynamic context based data. At 302, a server predicts user behavior using historical data. In this example, the server predicts that a user will not be home every Saturday night. A known prediction algorithm such as regression or neural network algorithm may be employed to predict user behavior based on historical data.

At 304, one or more sensor devices or IoT devices record information on current user behavior. For example, a smart meter detects atypical electricity (or another utility) usage. As another example, a network router detects user's phone access point. Yet as another example, user's electronic calendar stores or displays no planned social events.

At 306, the cognitive IoT gateway determines whether the current user behavior is deviating from the predicted behavior, using a machine learning technique such as a cluster analysis and a k-nearest neighbors algorithm. For example, the data predicted at 302 is compared with the data of the current user behavior determined at 304. For example, the server sends the predicted behavior to the cognitive IoT gateway.

The current user behavior is determined to be deviating from the predicted behavior if the difference between the two data are greater that a threshold value or outside of a marginal value.

If the current user behavior is deviating from the predicted user behavior, at 308, a gateway device that is local to the user analyzes and reviews occupancy data from the one or more sensor devices and augments the information with known safety information about the neighborhood. The gateway device then generates collated data that does not include private or protected information. For example, the gateway, having received information about user's (lack of) calendar entry on a Saturday night from user's smartphone and/or higher electricity usage from user's smart meter, sends information on the duration for which the user is home, as opposed to sending the current whereabouts of the user. At 310, the gateway sends the collated data to the server. In this way, private and protected information stays within the locality of the user, e.g., user's own device, and is not disseminated to another device such as a company's server.

At 312, the server (e.g., server computer) receives the collated data, and initiates computation of insurance premium based on real-time occupancy data indicated by the collated data. For example, as shown at 314, a base premium may be computed as a function of safety information of the area or neighborhood, time of day, suburb, and proximity to law enforcement station (e.g., police station). The collated occupancy information provided by the cognitive IoT gateway provides additional input to the computation and is used to augment the base premium. The updated home insurance premium may be adjusted from the insured's base premium if, for example, the insured is not home during the times that the user's is normally home. The final (updated) home insurance premium is the premium that is communicated to the insured.

At 316, the server sends the updated home insurance premium to the cognitive IoT gateway.

At 318, the cognitive IoT gateway receives the updated home insurance premium and sends a real-time notification of the home premium update to a user's device, for example, a user's phone.

At 320, the process repeats after a configured duration of time or if the context of the user changes, for example, the user's presence is no longer detected. For instance, after a configured duration expires and/or responsive to detecting absence of the user at home, the logic of the process returns to 306 to iterate the processing.

At 306, responsive to detecting that there is no deviation or the deviation is within a threshold, the processing may repeat, for example, after an expiration of a configured duration or responsive to detecting user absence at 320. In this scenario, the server maintains the previously determined home insurance premium as shown at 322.

Figure 4:
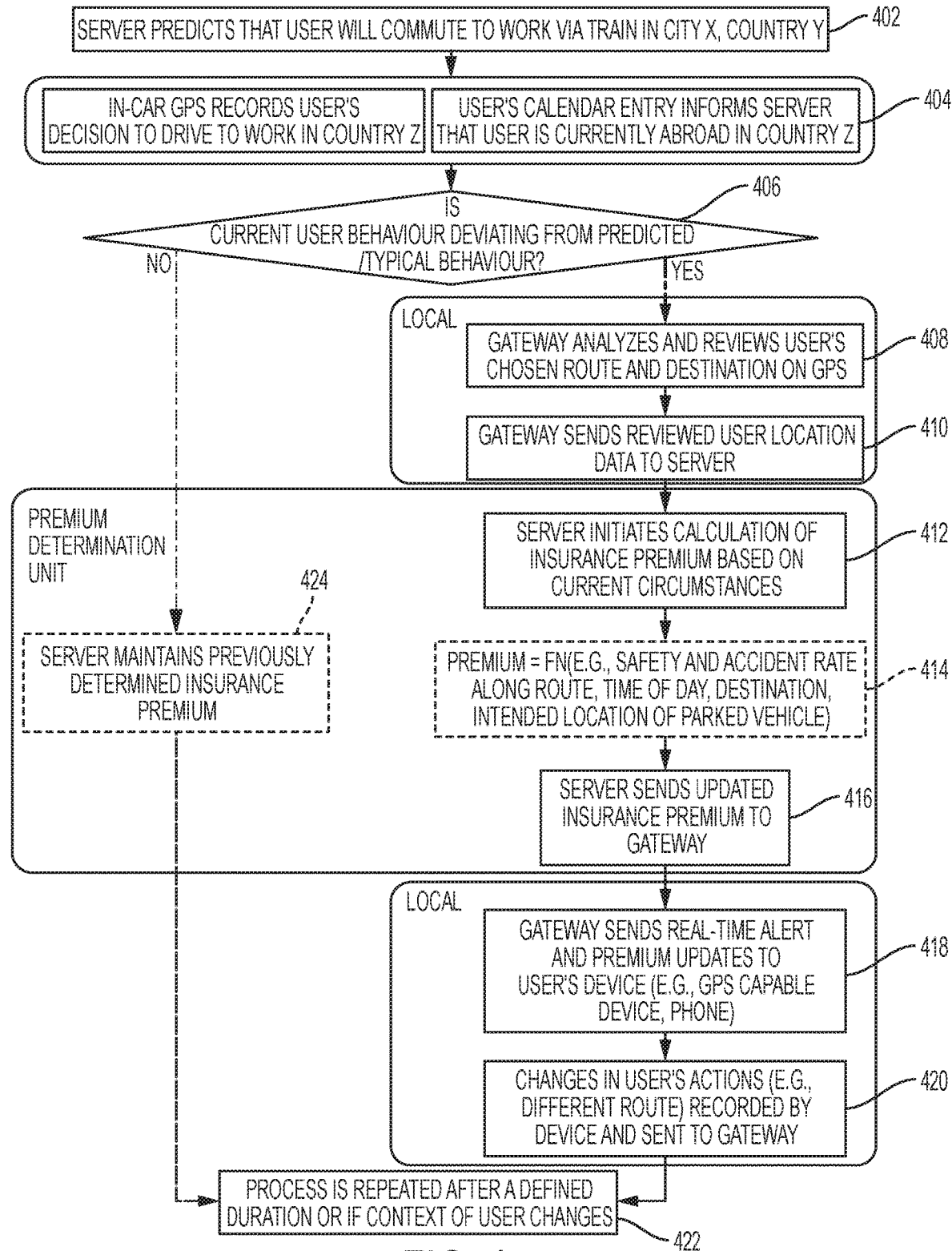
FIG. 4 is a flow diagram illustrating a method in one embodiment of the present disclosure with reference to another example scenario.

FIG. 4 is a flow diagram illustrating a method in one embodiment of the present disclosure with reference to an example scenario. At 402, a server predicts user behavior using historical data. In this example, the server predicts that the user will commute to work via public transportation, for example, a train in City A, in Country Z. A known prediction algorithm such as regression or neural network algorithm may be employed to predict user behavior based on historical data.

At 404, one or more sensor devices or IoT devices detect and record information on current user behavior. In one aspect, sensors have memory that enables the sensors to record user behavior. For example, an in-car GPS device records user's decision to drive to work in Country X, and the user's electronic calendar entry indicates and notifies a cognitive IoT gateway, which further notifies a server that the user is currently abroad in Country X.

At 406, a cognitive IoT gateway determines whether the current user behavior is deviating from the predicted (or recommended) behavior. For example, the data predicted at 402 is compared with the data of the current user behavior. The server may recommend the best (suitable) behavior/action to the users based on the policies and rules from the insurance company. For example, the recommended behavior/action may be sent to the IoT gateways, which sends the recommendation to the user. Then the IoT gateway can identify the user behavior/action per the data received from IoT devices and sensors. The IoT gateway can compare the recommended behavior/action to the actual user behavior/action and send a report to the server.

The current user behavior is determined to be deviating from the predicted behavior if the difference between the two data is greater that a threshold value or outside of a marginal value. In some embodiments, this can be determined using one or more anomaly detection techniques such as cluster analysis and k-nearest neighbors algorithm.

If the current user behavior is deviating from the predicted user behavior, at 408, a gateway device that is local to the user analyzes and reviews data from the one or more sensor devices. In this example, the gateway device analyzes and reviews the user's chosen route and destination on the GPS. The gateway device then generates a collated data that does not include private or protected information. At 410, the gateway sends the collated data to the server. In this way, private and protected information stays within the locality of the user, e.g., user's own device, and is not disseminated to another recipient device such as a company's server.

At 412, the server (e.g., server computer) receives the collated data, and initiates computation of insurance premium based on current circumstance indicated by the collated data. For example, as shown at 414, a premium may be computed as a function of safety factors of the area, accident rate along the current route, time of day, destination, intended location of parked vehicle. The information such as the location of the user, the destination or the exact route that the user decides to take are examples of information not sent to the server. Information that does not protect the privacy of the individual is not sent to the server.

At 416, the server sends the updated insurance premium to the cognitive IoT gateway.

At 418, the cognitive IoT gateway receives the updated insurance premium and sends a real-time alert and premium update to a user's device, for example a user's phone or other GPS-enabled devices which may include fitness trackers and smart watches. The real-time alert and premium update may be in the form of a text message to a smart phone, or push notifications on one or more wearable devices.

At 420, sensor and/or IoT devices continue to detect and record user actions, and changes are recorded and sent to the gateway device. In this example, different user routes may be detected. At 422, the process repeats after a configured duration or if the context of the user changes. An example of context change in user is the user driving on paved roads again (that is, the user's usual routine) after being on rough terrains for a definite amount of time. Another example of context change is the user returning to the user's country of residence. For instance, after a configured duration expires and/or responsive to detecting a change in user context, the logic of the process returns to 406 to iterate the processing.

At 406, responsive to detecting that there is no deviation or the deviation is within a threshold, the processing may repeat, for example, after an expiration of a configured duration or responsive to detecting a change in the user's route at 422. In this scenario, the server maintains the previously determined home insurance premium as shown at 424.

The user has a preloaded map (or another application from the insurance company) locally in the user's cognitive IoT gateway (for example, a mobile phone). The location of the user can be identified on the map and the user can enter the destination on the map (all information are local) and the map which is powered by insurance company's rules and policies can offer the best solution (safest) for that specific area to the user. The user preferences can also be considered, for example, whether the user prefers to use a car or public transport. After recommending an action/behavior, the cognitive IoT gateway can identify whether or not the user followed the recommended action/behavior (for example, whether or not the user traveled on the recommended route). If it is determined that the user did not travel on the recommended rout, the actual route can be identified and the cognitive IoT gateway may send a report to the server, which may recompute the premium.

Figure 5:
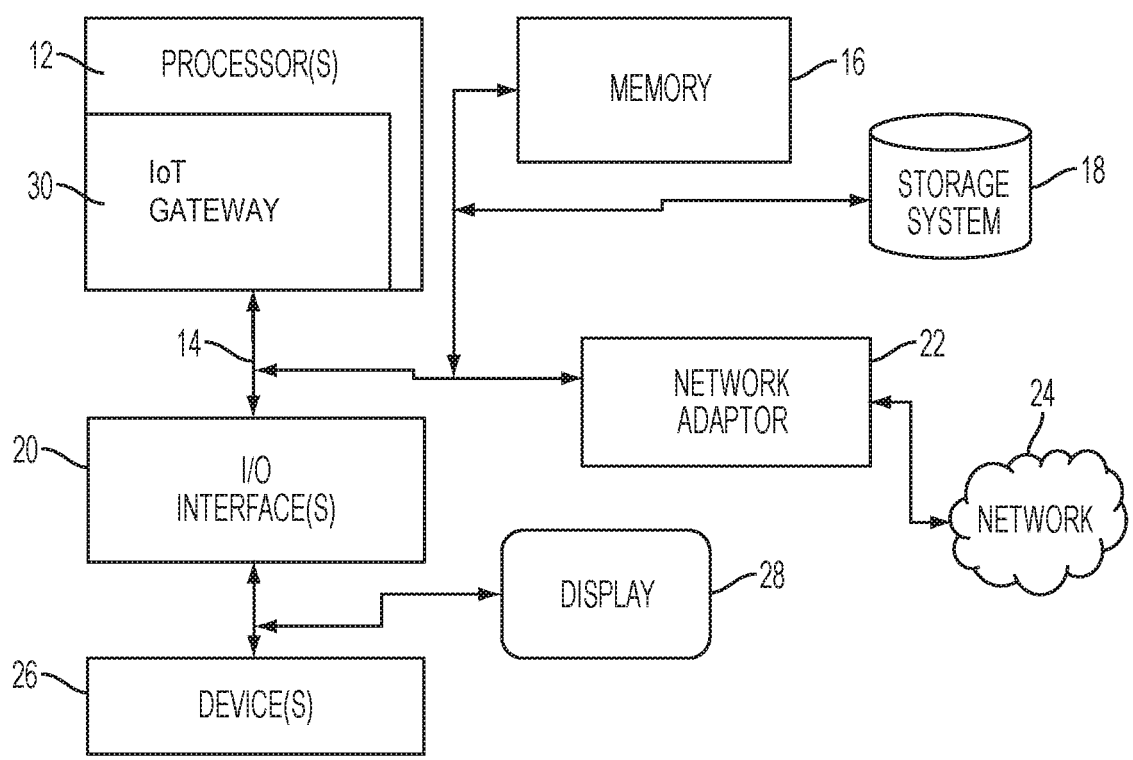
FIG. 5 illustrates a schematic of an example computer or processing system that may implement a cognitive IoT gateway system in one embodiment of the present disclosure.

FIG. 5 illustrates a schematic of an example computer or processing system that may implement a cognitive IoT gateway system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a cognitive IoT gateway module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A cognitive Internet of Things (IoT) gateway system, comprising:
 a hardware processor communicatively coupled to a server computer and sensor devices;
 the hardware processor receiving from the server computer a predicted user behavior data associated with a user, wherein the server computer has provided an offering to the user based on the predicted user behavior, the predicted user behavior data computed by executing a machine learning algorithm on historical data stored in a database;
 the hardware processor receiving real-time data associated with the user from the sensor devices that are detecting user data in real-time,
 the hardware processor determining whether the real-time data deviates from the predicted user behavior data, the predicted user behavior data being data based on which the offering was provided,
 responsive to determining that the real-time data deviates from the predicted user behavior data, the hardware processor transforming the real-time data into collated data that removes protected and sensitive information from the real-time data, and transmitting the collated data to the server computer, wherein the protected and sensitive information received from the sensor devices remain local to the hardware processor,
 the hardware processor receiving from the server computer an updated offering, the updated offering computed by the server computer based on the collated data, and
 the hardware processor transmitting a real-time alert to a user device to notify the user of the updated offering from the server computer,
 wherein the hardware processor transforming the real-time data into collated data that removes protected and sensitive information from the real-time data comprises at least the hardware processor transforming a geographical coordinate location data into an amount of time spent on a type of location the geographical coordinate location data can be categorized into, the hardware processor transmitting the collated data without the geographical coordinate location data,
 wherein the offering is an insurance premium and the server computer is associated with an insurance industry providing insurance to the user, wherein the insurance premium that is offered to the user is dynamically adjusted based on user's real-time behavior detected by the sensor devices,
 wherein the offering is a home insurance premium and the user's real-time behavior comprises occupancy of the user's home, wherein the hardware processor determines whether the real-time data deviates from the predicted user behavior data by detecting that connection is not established between the hardware processor and the user device during a specified timeframe.

2. The system of claim 1, wherein the hardware processor is a component of a smartphone associated with the user.

3. The system of claim 1, wherein the sensors comprise one or more of a wearable device, a location tracking device, a camera, motion detector, and a utility usage sensor.

4. The system of claim 1, wherein the hardware processor is deployed with an app received from the server computer and the hardware processor performs the receiving steps, the determining steps, the transforming, and the transmitting steps by executing the app.

5. The system of claim 1, wherein the offering further includes a car insurance premium and the user's real-time behavior comprises road conditions of a route in which the user is currently driving.

6. A method of providing a cognitive IoT gateway, the method executed by at least one hardware processor communicatively coupled to at least a server computer and sensor devices, comprising:
receiving from the server computer a predicted user behavior data associated with a user, wherein the server computer has provided an offering to the user based on the predicted user behavior, the predicted user behavior data computed by executing a machine learning algorithm on historical data stored in a database;
receiving real-time data associated with the user from the sensor devices that are detecting user data in real-time;
determining whether the real-time data deviates from the predicted user behavior data, the predicted user behavior data being data based on which the offering was provided;
responsive to determining that the real-time data deviates from the predicted user behavior data, transforming the real-time data into collated data that removes protected and sensitive information from the real-time data, and transmitting the collated data to the server computer, wherein the protected and sensitive information received from the sensor devices remain local to the hardware processor;
receiving from the server computer an updated offering, the updated offering computed by the server computer based on the collated data; and
transmitting a real-time alert to a user device to notify the user of the updated offering from the server computer,
wherein the transforming the real-time data into collated data that removes protected and sensitive information from the real-time data comprises at least transforming a geographical coordinate location data into an amount of time spent on a type of location the geographical coordinate location data can be categorized into, wherein the collated data is transmitted to the server without the geographical coordinate location data,
wherein the offering is an insurance premium and the server computer is associated with an insurance industry providing insurance to the user, wherein the insurance premium that is offered to the user is dynamically adjusted based on user's real-time behavior detected by the sensor devices,
wherein the offering is a home insurance premium and the user's real-time behavior comprises occupancy of the user's home, wherein the hardware processor determines whether the real-time data deviates from the predicted user behavior data by detecting that connection is not established between the hardware processor and the user device during a specified timeframe.

7. The method of claim 6, wherein the hardware processor is a component of a smartphone associated with the user.

8. The method of claim 6, wherein the sensors comprise one or more of a wearable device, a location tracking device, a camera, motion detector, and a utility usage sensor.

9. The method of claim 6, wherein the hardware processor is deployed with an app received from the server computer and the hardware processor performs the receiving steps, the determining steps, the transforming, and the transmitting steps by executing the app.

10. The method of claim 6, wherein the offering further includes a car insurance premium and the user's real-time behavior comprises road conditions of a route in which the user is currently driving.

11. A computer program product for providing a cognitive IoT gateway, the computer program product comprising a computer readable storage medium having program instructions embodied therewith, the program instructions executable by a device to cause the device to:
receive from a server computer a predicted user behavior data associated with a user, wherein the server computer has provided an offering to the user based on the predicted user behavior, the predicted user behavior data computed by executing a machine learning algorithm on historical data stored in a database;
receive real-time data associated with the user from sensor devices that are detecting user data in real-time;
determine whether the real-time data deviates from the predicted user behavior data, the predicted user behavior data being data based on which the offering was provided;
responsive to determining that the real-time data deviates from the predicted user behavior data, transform the real-time data into collated data that removes protected and sensitive information from the real-time data, and transmit the collated data to the server computer, wherein the protected and sensitive information received from the sensor devices remain local to the machine;
receive from the server computer an updated offering, the updated offering computed by the server computer based on the collated data; and
transmit a real-time alert to a user device to notify the user of the updated offering from the server computer,
wherein the offering is an insurance premium and the server computer is associated with an insurance industry providing insurance to the user, wherein the insurance premium that is offered to the user is dynamically adjusted based on user's real-time behavior detected by the sensor devices,
wherein the offering is a home insurance premium and the user's real-time behavior comprises occupancy of the user's home, wherein the device is caused to determine whether the real-time data deviates from the predicted user behavior data by detecting that connection is not established between the device and the user device during a specified timeframe.

12. The computer program product of claim 11, wherein the machine is a component of a smartphone associated with the user.

13. The computer program product of claim 11, wherein the sensors comprise one or more of a wearable device, a location tracking device, a camera, motion detector, and a utility usage sensor.

14. The system of claim 1, wherein the hardware processor transforming a geographical coordinate location data into an amount of time spent on a type of location the geographical coordinate location data can be categorized into, comprises at least, the hardware processor transforming the geographical coordinate location data into the amount of time spent on an unpaved road.

15. The method of claim 6, wherein the transforming a geographical coordinate location data into an amount of time spent on a type of location the geographical coordinate location data can be categorized into, comprises at least, transforming the geographical coordinate location data into the amount of time spent on an unpaved road.

\* \* \* \* \*